(12) United States Patent
Chandrasiri et al.

(10) Patent No.: US 7,746,851 B2
(45) Date of Patent: Jun. 29, 2010

(54) SECURE COMMUNICATIONS WITHIN AND BETWEEN PERSONAL AREA NETWORKS BY USING PRIVATE AND PUBLIC IDENTIFIERS

(75) Inventors: Pubudu Chandrasiri, Berkshire (GB); Bulent Ozgur Gurleyen, Berkshire (GB); Mats Naslund, Vallingby (SE); Annika Jonsson, Stockholm (SE); Christian Gehrmann, Lund (SE); Yashar Shahabi, London (GB)

(73) Assignee: Vodafone Group PLC, Newbury, Berkshire (GB)

( * ) Notice: Subject to any disclaimer, the term of this patent is extended or adjusted under 35 U.S.C. 154(b) by 405 days.

(21) Appl. No.: 10/579,697

(22) PCT Filed: Nov. 5, 2004
(Under 37 CFR 1.47)

(86) PCT No.: PCT/GB2004/004703
§ 371 (c)(1),
(2), (4) Date: Jun. 5, 2008

(87) PCT Pub. No.: WO2005/053273
PCT Pub. Date: Jun. 9, 2005

(65) Prior Publication Data
US 2008/0317036 A1    Dec. 25, 2008

(30) Foreign Application Priority Data
Nov. 19, 2003   (GB) ................... 0326969.3

(51) Int. Cl.
H04L 12/28    (2006.01)
(52) U.S. Cl. ...................... 370/389; 370/401
(58) Field of Classification Search .......... None
See application file for complete search history.

(56) References Cited

U.S. PATENT DOCUMENTS

2002/0165006 A1* 11/2002 Haller et al. ............... 455/556

(Continued)

FOREIGN PATENT DOCUMENTS

EP    1343298    3/2003

(Continued)

OTHER PUBLICATIONS

Neimeggers I.G. et al.: "From Personal Area Network to Personal Networks:" Wireless Personal Comm. 26, 2002 p. 175-176. Refer e.g. to abstract, text last chapter p. 177-middle p. 178 and fig. 1. Section 8, p. 182, two first chapters.

(Continued)

*Primary Examiner*—Ayaz R Sheikh
*Assistant Examiner*—Faiyazkhan Ghafoerkhan
(74) *Attorney, Agent, or Firm*—Workman Nydegger

(57) ABSTRACT

A Personal Area Network Security Domain (PSD) (50) is formed between PDA (52), mobile terminal (54), PC (56) and printer (58). The PSD (50) allows the sharing of resources between the devices within the PSD. If the devices within the PSD (50) are located remotely from one another, communication between those devices will be performed via mobile or cellular telephone network (66) and the Internet (68). For each set or association of similarly located devices within the PSD (50), one of those devices will be a gateway device. The gateway device is a device that is configured to communicate with an external communications medium (mobile network (66) or the Internet (68)). Data transmissions to other devices within the PSD are channelled through the relevant gateway. In another embodiment resources are shared between the two separate PSDs (of which may or may not be remotely located with respect to one another) by means of data exchanges between the respective gateway devices of the two PSDs.

46 Claims, 9 Drawing Sheets

U.S. PATENT DOCUMENTS

| | | | |
|---|---|---|---|
| 2003/0118002 A1* | 6/2003 | Bradd et al. | 370/352 |
| 2003/0133451 A1* | 7/2003 | Mahalingaiah | 370/389 |
| 2003/0165121 A1* | 9/2003 | Leung et al. | 370/313 |

FOREIGN PATENT DOCUMENTS

| | | |
|---|---|---|
| GB | 2372910 | 9/2002 |
| GB | 2386035 | 9/2003 |
| GB | 2389743 | 12/2003 |
| GB | 2399474 | 9/2004 |
| WO | WO 02/19585 | 3/2002 |
| WO | WO 02/43333 | 5/2002 |
| WO | WO 02/51093 | 6/2002 |
| WO | WO 02/082773 | 10/2002 |
| WO | WO 02/096018 | 11/2002 |

OTHER PUBLICATIONS

Smith M. et al.: Network Security Using NAT and NAPT. Proceedings of IEEE International Conference on Networks, Icon, Aug. 27, 2002, pp. 355-360.

* cited by examiner

Fig. 14.

| Destination; 1.1.1.1 | Source; 169.254.1.6 | Payload |
|---|---|---|
| 102 | 104 | 100 |

Fig. 15.

| Outer Destination; 1.1.1.1 | Outer Source; 169.254.1.6 | UDP/ESP | Inner Destination; 169.254.1.1 | Inner Source; 169.254.1.6 | Payload |
|---|---|---|---|---|---|
| 108 | 107 | 106 | 102 | 104 | 100 |

Fig. 16.

| Outer Destination; 1.1.1.1 | Outer Source; 2.2.2.2 | UDP/ESP | Inner Destination; 169.254.1.1 | Inner Source; 169.254.1.6 | Payload |
|---|---|---|---|---|---|
| 108 | 104 | 106 | 102 | 104 | 100 |

Fig. 17.

| Outer Destination; 169.254.1.1 | Outer Source; 2.2.2.2 | UDP/ESP | Inner Destination; 169.254.1.1 | Inner Source; 169.254.1.6 | Payload |
|---|---|---|---|---|---|
| 102 | 107 | 106 | 102 | 104 | 100 |

Fig. 18.

| Destination; 169.254.1.1 | Source; 169.254.1.6 | Payload |
|---|---|---|
| 102 | 104 | 100 |

SECURE COMMUNICATIONS WITHIN AND BETWEEN PERSONAL AREA NETWORKS BY USING PRIVATE AND PUBLIC IDENTIFIERS

TECHNICAL FIELD

The present invention relates to the sharing of resources between a plurality of devices.

DISCLOSURE OF INVENTION

According to one aspect of the present invention, there is provided a method of sharing resources between a plurality of devices, each one of the devices being provided in a first association of devices or a second association of devices and each having an internal identifier for identifying the device within its association for the purpose of delivering communications to that device, wherein, when a device within the first association of devices sends a communication relating to the provision of resources to a device in the second association of devices, that communication is provided with an external identifier for enabling that communication to be received by the relevant device in the second association of devices.

There may be more than two associations of devices.

In each association of devices there may be one or more devices.

According to a second aspect of the present invention, there is provided a system for allowing the sharing of resources between a plurality of devices, each one of the devices being provided in a first association of devices or a second association of devices and each having an internal identifier for identifying the device within its association for the purpose of delivering communications to that device, the system including means for providing a communication from a device within the first association of devices, relating to the provision of resources, to a device in the second association of devices with an external identifier for enabling that communication to be received by the second association of devices.

According to a third aspect of the present invention, there is provided an association of devices between which resources are shared, wherein each device has an internal identifier for identifying the device within its association for the purpose of delivering communications to that device; and wherein a device within the association of devices is operable to send a communication relating to the provision of resources to a device in a second association of devices, which communication is provided with an external identifier for enabling that communication to be received by the second association of devices.

According to a fourth aspect of the present invention, there is provided a method of enabling the data communication between a plurality of devices, the method including enabling communication between the devices via a first communications medium by associating with each device a respective identifier that allows communication from the devices to be received via the first communications medium; and enabling communications between particular ones of the devices via a second communications medium by generating for each of the particular devices a respective further identifier that allows communications to be received via the second communications medium.

According to a fifth aspect of the present invention, there is provided a method of allowing selected devices within the network to be associated in a domain, each device being capable of communicating with the other devices of the domain, the method including adapting one device within the domain to provide each other device with identification data, the identification data of each device being interpretable by each other device within the domain, particular modes of communication only being allowed between devices within the domain having such identification data; and adapting one device within the domain to allow communication between the said devices and other devices associated in another domain.

According to a sixth aspect of the present invention, there is provided a method of allowing selected devices within the network to be associated in a first and/or a second domain, each device being capable of communicating with the other devices of its domain, the method including: adapting one device within the first domain to provide each other device in that domain with identification data, the identification data of each device being interpretable by each other device within the domain, particular modes of communication only being allowed between devices within the domain having such identification data; adapting one device within the second domain to provide each other device in that domain with identification data, the identification data of each device being interpretable by each other device within the domain, particular modes of communication only being allowed between devices within the domain having such identification data; and adapting one device within the first domain to communicate with one device within the second domain to allow resources provided by the devices within the respective domains to be shared between the respective domains.

BRIEF DESCRIPTION OF THE DRAWINGS

For a better understanding of the present invention, embodiments will now be described by way of example, with reference to the accompanying drawings, in which:

FIGS. 14 to 18 show the formation, encapsulation and "de-capsulation" of the data packet that is transmitted in the reverse direction to the data packet of FIGS. 9 to 13;

MODES OF CARRYING OUT THE INVENTION

Figure 1:
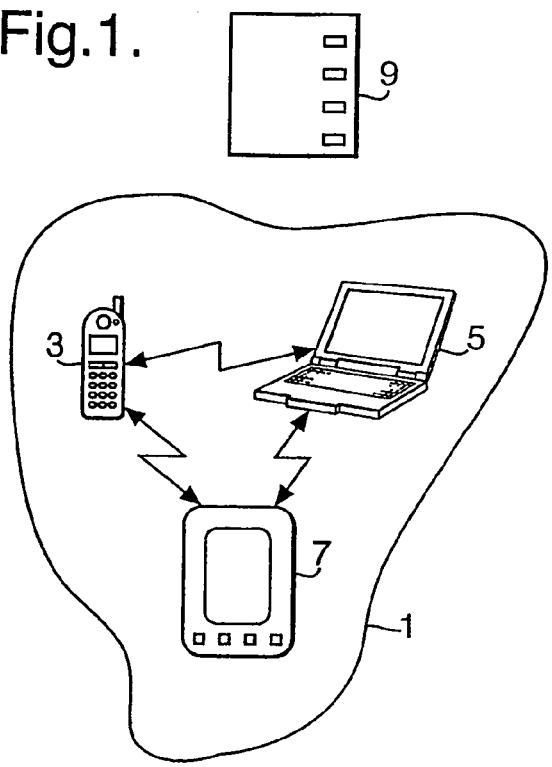
FIG. 1 shows a personal area network (PAN) including a plurality of devices belonging to one user.

FIG. 1 shows a personal area network (PAN) 1 including a plurality of devices belonging to one user. Within the PAN 1 it is desired that all the individual devices can communicate and share resources with other devices of the same user in seamless fashion. From a security standpoint, this requires individual devices to identify other devices owned by the same user when offering or requesting services. Further, in order to protect data confidentiality, individual devices should be able to communicate securely with each other. Depending on the number of devices within the PAN 1 and the services they offer, this can become very complicated. This problem is further complicated because the number of devices will be changing with time as devices join and leave the PAN 1.

A PAN is different from a conventional network in that communication between devices is not necessarily through a server.

If such a multitude of devices in a PAN are expected to have coherent behaviour, all devices should be able to fit into a distributed terminal architecture capable of taking into consideration the ownership and privileges required for individual devices to operate.

In FIG. 1 the devices in the personal area network 1 comprise a GPRS mobile telephone 3, laptop computer 5 and personal digital assistant (PDA) device 7. As indicated by the arrows, each of the devices 3, 5, 7 is capable of communicating with the other devices within the PAN 1. In this example each of the devices 3, 5, 7 is a Bluetooth device, allowing the devices 3, 5, 7 to be inter-operable. Data communication between the devices 3, 5, and 7 may be by means of cables, or by infrared communication, radio communication or by any other wireless means.

For example, the PDA 7 will connect to the mobile telephone 3 to access the Internet and to the laptop computer 5 to synchronise the user's calendar or to exchange files for other reasons.

Conventionally, each pair of devices 3, 5 and 7 must be separately configured to communicate with each other. This will require three separate configuration processes, for example between the laptop 5 and the PDA 7, the laptop 5 and the mobile telephone 3 and the mobile telephone 3 and the PDA 7. After an initial configuration processes the devices 3, 5, 7 may communicate with one another, although typically this will require the user to manually select a communication mode on each of two devices to communicate with one another. The devices may be configured to require the user to enter a personal identification number (PIN) before data exchange between a pair of devices can begin in order to, for example, prevent an unwanted device being substituted for one of the devices 3, 5 and 7 and obtaining or over-writing data from a device within the PAN 1.

In such a PAN 1, if it is desired to add a further device, such as MP3 player 9, it will be necessary to configure separately each of the devices 3, 5, 7 within the PAN 1 to communicate with the MP3 player 9. It will be appreciated that, as the number of devices within the PAN 1 increases, the addition of a new device to the PAN 1 requires an increasing number of configuration steps. For a conventional PAN having n components, $n*(n-1)/2$ component associations must be performed to form the PAN.

Advantageously, a group of devices within a PAN form a PAN Security Domain (PSD), as described in United Kingdom patent application No. 0220463.4 (Vodafone Group plc). A PSD is a group of components inside a PAN where each component can be authenticated, trusted and securely communicated with by means of some common security association. This reduces the number of component association procedures required.

In a PSD one device has the role of a PSD administrator or controller. This device includes security data (for example a shared key or a public-private key pair) that can be selectively passed to other devices that are to join the PSD. Communication can only successfully occur between devices that have this security data. Once a device has the security data, it can communicate with other devices in the PSD without necessarily referring to the PSD administrator. When a device is added to the PSD the PSD administrator advises each device of the addition of a new device to the PSD. If there are n devices in the PSD this requires n−1 inter-device communications. It is not necessary for the new device to separately pair or associate itself with each other device in the PSD.

The security association could be in the form of a shared secret key or a shared group key based on public key techniques, with a mutual "trust" being established between the devices by a personal certification authority (CA) within the PSD. Certificates issued to all PSD members indicate the device as a member of that PSD. The group key is not used for secure bilateral communications in the PSD, which takes place using bilaterally established keys—KAB allowing secure bilateral communication between devices A and B, KBC allowing secure bilateral communication between devices B and C, and KAC allowing secure bilateral communication between devices A and C—(discussed further below). The group key is used only for proof of PSD membership, secure PSD-wide broadcasts and PSD-wide secure communications.

The initial decision as to whether a device can be part of a PSD or not will be on user judgement followed up by positive authentication of the device based on a public key infrastructure (PKI) trusted root certificate. Alternatively, another known authentication method could be used.

One device within the PSD is nominated as the PSD administrator. The PSD administrator is a role that could be assumed by any of the devices in the PSD provided it contains the necessary hardware to support the role, for example a secure key store and/or a display. The administrator role may be moved from one device to another. If the administrator role is moved to a new device, the new device will have passed thereto, or have pre-stored thereon, the necessary security data to allow the admission of new devices to the PSD.

The PSD administrator also is responsible for configuring and managing the policies (described below) governing the devices in the PSD. Additionally it is responsible for enrolling new members in the PSD. The PSD administrator could also contain the personal CA that is responsible for issuing certificates to the PSD members. Advantageously, the PSD administrator will be the device with the greatest processing power and the best user interface. In a PSD based on the PAN 1 of FIG. 1, the administrator is laptop 5.

When a single user owns all devices in a PSD and treats them equally, such a configuration of devices will not contain any restrictions based on the identity of a device. All shared resources will be made available to all the PSD member devices. In other words, there is group "trust" between the devices. If a device is a member of the PSD, the other devices will assume that the devices can be trusted and communicated with. There is no need for each device to set up an individual trust relationship with each other device, in contrast to a conventional PAN as described above. Provided that the device is admitted to the group by the PSD administrator, the other devices will assume that the newly-admitted device can be trusted.

Figure 2:
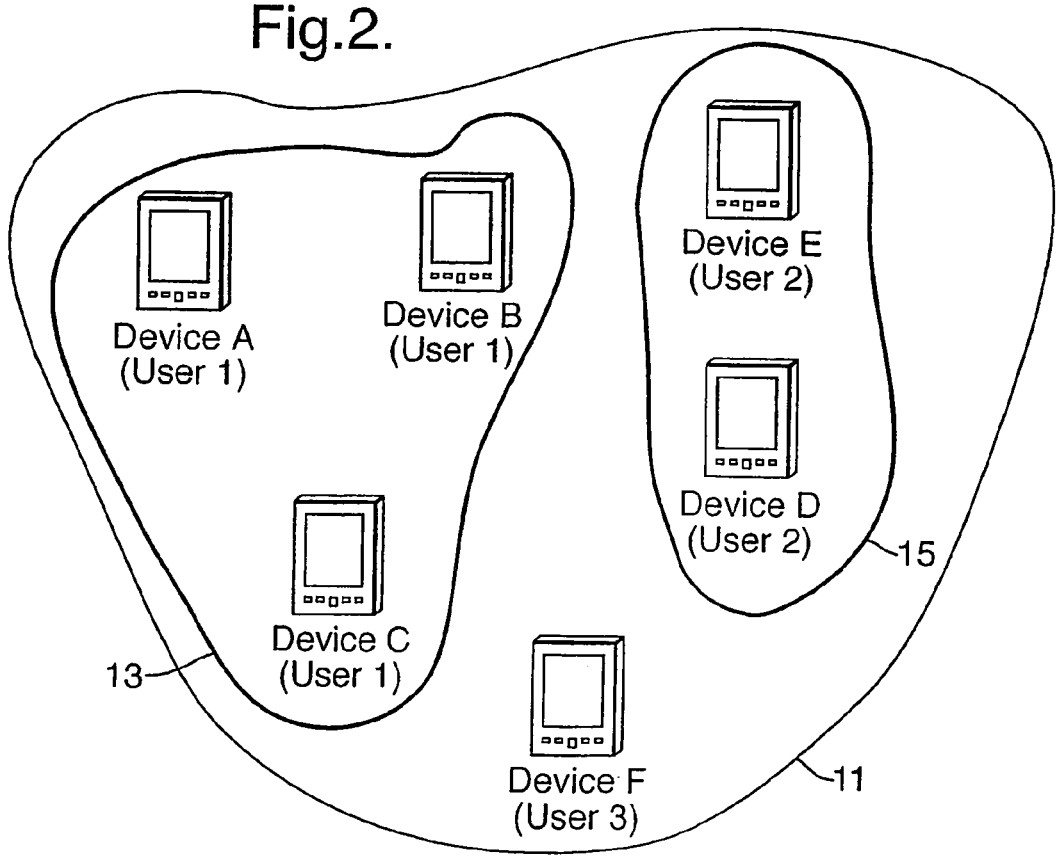
FIG. 2 shows a personal area network (PAN) having two PAN Security Domains (PSDs) formed therein.

FIG. 2 illustrates a PAN 11 containing six devices, designated A to F. The devices shown in FIG. 2 are all PDAs but it should be understood that they could be other types of device, or a combination of different devices, as in FIG. 1. Devices A, B and C are owned by the same user (user 1) while D and E are owned by another user (user 2). A third user (user 3) owns device F. All these devices are capable of communicating with other using their local interfaces.

A first PSD 13 includes devices A, B and C. These devices will be able to share resources and communicate with each other securely. A second PSD 15 includes devices D and E. Again, these devices will be able to share resources and communicate with each other securely.

If membership of one PSD is limited to devices, such as devices A, B and C, from a single user, two users will not be able share any resources. Sharing of resources could be achieved if the existing PSDs are configured so that device sharing between the PSDs is possible.

One way for the two users to share resources is to establish a new PSD. Depending on the situation, this PSD could be a temporary or a permanent PSD including the devices with the resources required to be shared.

Figure 3:
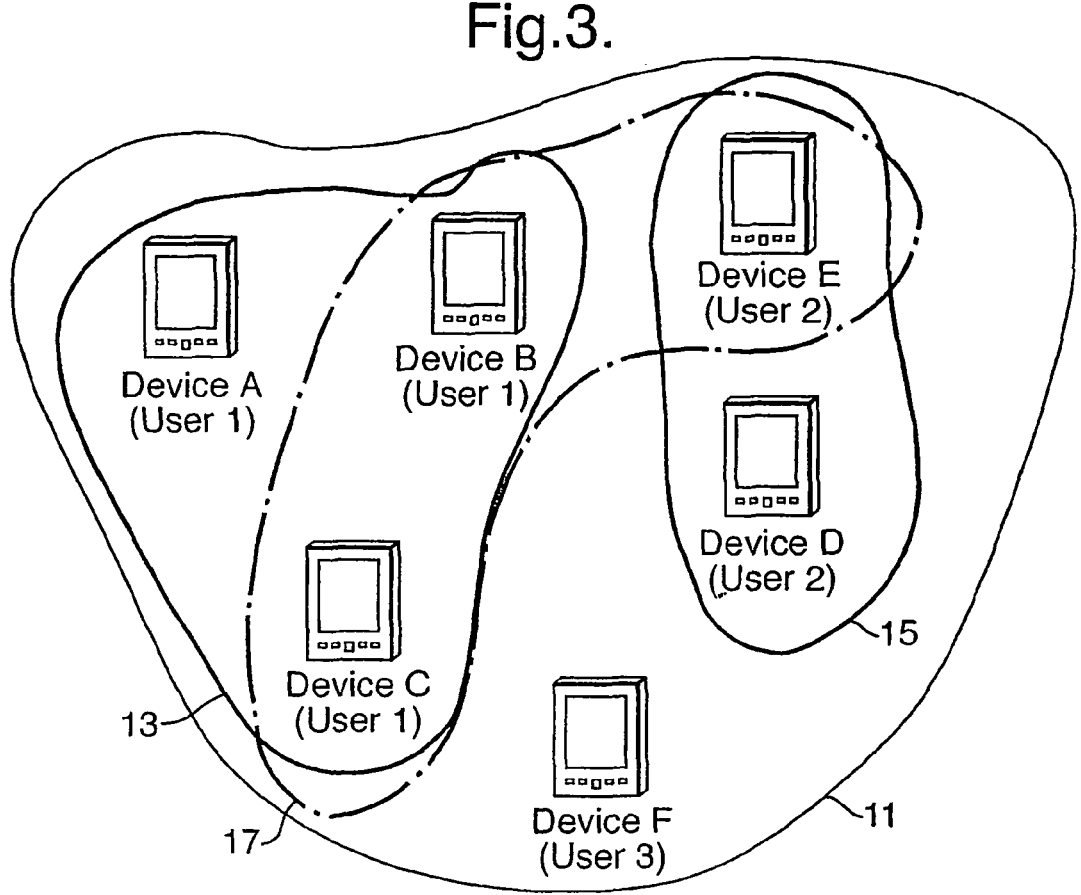
FIG. 3 shows the formation of a further PSD in the PAN of FIG. 2.

FIG. 3 shows a new PSD 17 formed between devices B, C and E. This will require a security association between two devices belonging to users 1 and 2. This association does not have to be between the very same devices that are going to be part of the new PSD. The original PSD could transmit the necessary data to introduce the new device to the PSD to all its member devices. Alternatively, the users 1 and 2 could pair two devices (one from each user) and then add further devices as required using one of the original devices as the PSD administrator.

When forming a PSD with devices from different users, it is not always straightforward to assign a PSD administrator. It might have to be mutually agreed by all parties in the PSD. Alternatively, the device that initially created the PSD could assume this role. Nevertheless, if required it could be handed over to another device in the PSD.

Each user can then configure their device policies to share the required resources with the members of the newly formed PSD.

User 1 will configure the policy on B and C while user 2 will do the same for E. Individual devices could contain a number of built in or preset configurations that could be activated by the user for different PSDs.

If required a PSD could also be used to establish different groups within a set of devices owned by the same user.

In addition to the temporary PSD between user 1 and user 2, either of them could establish another PSD to share resources with user 3. In order to keep the PSD concept simple, user 2 cannot use one of his devices, say E to establish a PSD between user 1 and 3, i.e. E cannot bridge the trust between the two different PSDs. Nonetheless, this could be achieved if E used as a PSD administrator to form a PSD involving devices from user 1 and user 3.

Figure 4:
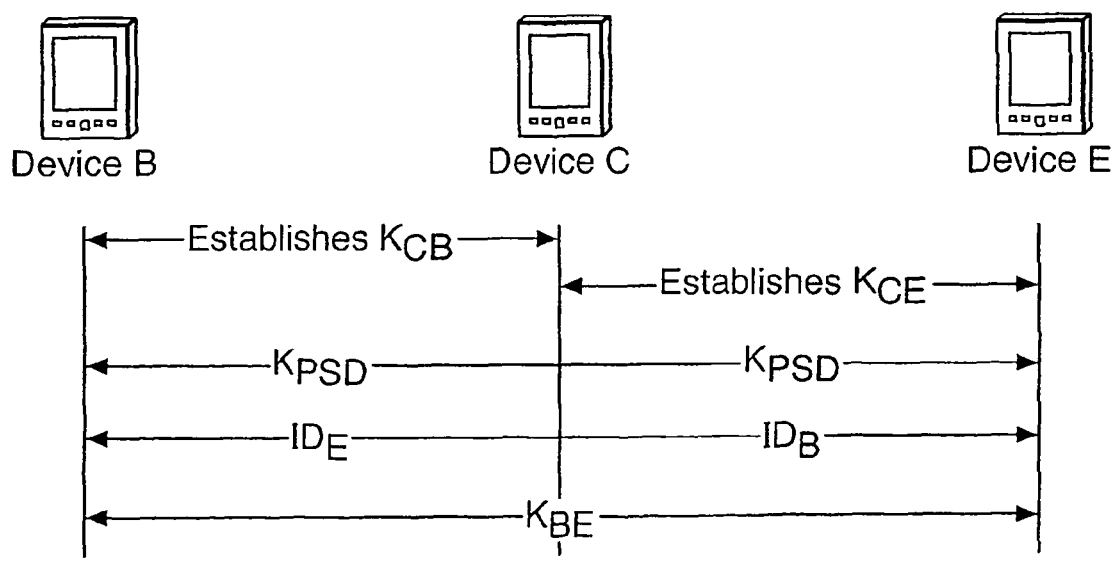
FIG. 4 shows the exchange of data between devices within a PSD.

The formation of a PSD between devices B, C and E, with identifiers IDB, IDC and IDE respectively, will now be described in more detail, with reference to FIG. 4. In order for these devices to form a PSD, two security associations between the three devices are needed. For example, these could be {B, C} and {C, E}. Based on these associations, it is possible for B and C, and C and E to communicate securely. Device C performs the role of PSD administrator. C then generates a group PSD membership key KPSD and communicates this to each of the devices. C then communicates the identifiers of all PSD members to each other, i.e. forwards IDB and IDE to E and B respectively. Together with KPSD, B and E are now in a position to generate a further key KBE to allow secure communications between them. FIG. 4 of the drawings shows the exchange of data between devices.

Alternatively, device C can have the role of a personal CA and issue B and E with certificates to carry out the above key exchanges using a local PKI. The possession of this certificate is equivalent to having access to KPSD, i.e. its proof of membership in the PSD.

However, forming a PSD itself does not impose any behaviour patterns or rules on the individual devices themselves. These must be achieved through a suitable "policy". This policy will set guidelines on behaviour and dictate how resources should be used and how the device should behave under different circumstances.

PSD policy can be used to enforce restrictions on any of the following:

a. Available resources.

b. Requirements for joining the PSD as a member.

c. Requirements to assume the role of the PSD administrator.

d. User interaction.

e. Usage of chargeable services.

f. The ability to install new applications.

Devices from more than one user may be PSD members.

The PSD policy file is in a standardised format to achieve interoperability between devices and it contains information about the resources available to different devices depending on the PSD to which they belong. All the resources listed in the file do not have to be available to the PSD all the time. These entries can be for future use when the resource is available to the PSD.

Each device has its own version of the policy file that states which resources are available from that particular device to the rest of the PSD members. Hence the policy file for two devices with different resource commitments to the PSD will differ. Devices may update or modify this as and when resources are either added to the PSD or removed from the PSD. Alternatively, the device might rely on the PSD administrator to do this on the devices behalf.

Depending on the access control mechanism it might be required to the store the policy file locally on a device. Nevertheless it is possible for a device to enquire and obtain policy information from a trusted device. It is not required for this trusted device to be a member of the same PSD.

The significance of each entry in a device policy is explained below.

| Resource Type & ID | Target ID | Authorisation ID |
|---|---|---|
| GPRS | C | |
| ... | ... | ... |

An Example PSD Policy File

Resource Type & ID

This contains information about the ID of the resource and its type. The ID is required to uniquely identify the resource within a component. The type of the resource is important when enforcing "Permissions Types" (discussed below) applicable to a resource.

Different resources on a component can be divided into four broad functional areas depending on their impact on the hosting component and its user.

1. Local Services—Printers, projectors, etc.
2. Network Interfaces—GSM, GPRS, BT, IrDA, WLAN, etc., or similar resources related network connectivity 3. Personal Information Management—Calendar, Phonebook, Location information etc., which are of personal value and will have privacy issues associated with them.
4. Executables—refers to code downloaded from another component on to the target device.

The above is merely an example of resources.

Target ID

Uniquely identifies within the PSD the component where the resource is located. It is useful to identify resources within the PSD when the resource is available from more than one component in the PSD.

Authorisation ID

PSD members preferably have access to all PSD resources that have been made available by the policy file. If the PSD relies on a PSD administrator to access PSD resources, then the Authorisation ID should be the ID of the component assuming the role of the PSD administrator. If the component is to have the autonomy to authorise other components access to its resources, then the Authorisation ID is the same as the Target ID. When there are devices from more than one user, it is likely that the devices will retain the ability to authorise themselves without having to rely on a PSD administrator.

Figure 5:
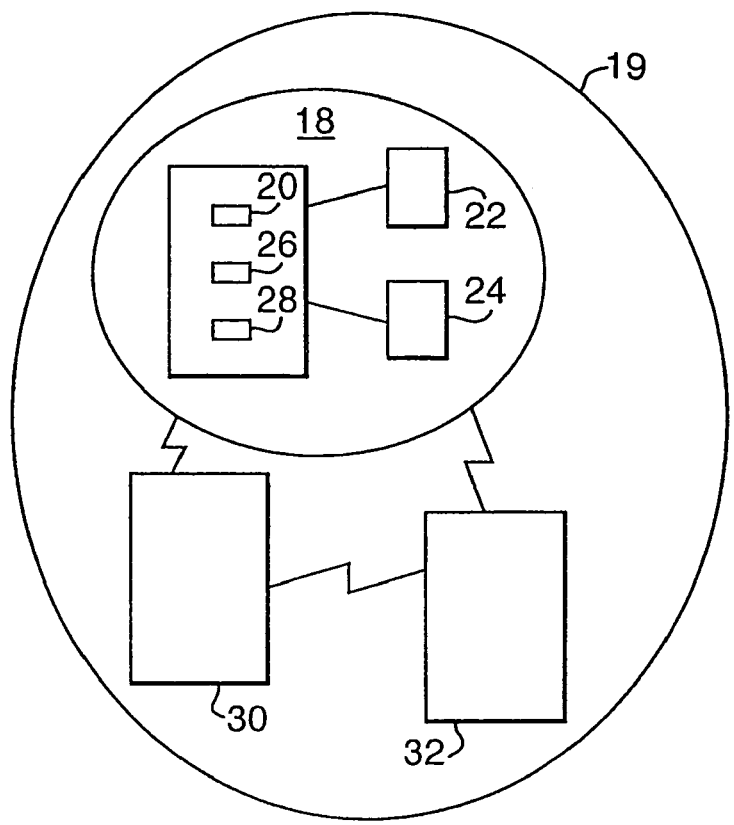
FIG. 5 shows a PSD, including the structure necessary for resource sharing within the PSD.

FIG. 5 shows a device 18 within a PSD 19. The device includes PSD policy instructions (PP) 20, storing the PSD policy data described above.

The device 18 has associated therewith resources 22 and 24, which may be useful to other devices 30 and 32 within the PSD 19. For example, if the device is a laptop computer, such resources may be the LCD display and a printer, and, if the device is a mobile telephone, the resources may be SMS transmission/reception and the personal telephone book stored on the mobile telephone. It should, of course, be understood that these are merely examples of devices and resources.

The device 18 also includes component policy instructions (CP) 26. These instructions control the allocation of resources 22, 24 to local requests, i.e. requests from the device 18 itself. These instructions control use of local resources in a generally conventional manner, and have a very similar function to the security policy used in the MIDP 2.0 standard.

The device 18 further includes component PSD profile instructions (CPP) 28. These instructions control the use of resources 22 and 24 by the other devices 30 and 32 in the PSD 19. If the device 18 is a member of more than one PSD, it will have more than one set of PSD policy instructions and more than one set of component PSD profile instructions. However, for the sake of simplicity, in the present example, the device 18 is a member of only one PSD, PSD 19.

It will generally be desired that (although the invention is not so restricted) any restrictions in the component policy instructions 26 to use of resources 22, 24 in response to local requests will also be applied to requests of other members 30, 32 of the PSD 19. Therefore, the component PSD profile instructions 28 will include the restrictions of the component policy instructions 26.

In addition, typically the component PSD profile instructions 28 will impose further restrictions on use of the resources 22, 24 by the other devices 30, 32 of the PSD 19. For example, if the device 18 is a GPRS mobile terminal, the component PSD profile may allow the mobile terminal to be used as a modem for downloading data to the devices 30, 32, but may restrict the maximum quantity of downloaded data to 500 KB in any given period—for example 24 hours. If further requests for data downloading are received from the devices 30, 32, the component PSD profile instructions 28 may be configured such that the user of the device 18 receives a (visual and/or audio) prompt from the mobile terminal indicating that a further request for data download has been made, seeking authorisation from the user of the device 18 for this further data download. For example, the component PSD profile instructions 28 may also allow access to the personal telephone book stored on the mobile terminal, but may not permit access to the SMS messages stored on the mobile terminal.

It should be understood that these are merely examples of resource sharing. The component PSD profile instructions 28 can be configured to prohibit or allow sharing of any resources provided by the device 18. The component PSD profile instructions 28 will also set any limitations on use of resources—such as limiting the amount of use or requiring a user prompt for authorisation of resource use. Of course, components 30 and 32 will include their own resources that may be shared by device 18 within the PSD 19, and will include PSD policy instructions, component policy instructions and component PSD profile instructions. However, these are not shown in FIG. 5, for the sake of simplicity.

Figure 6:
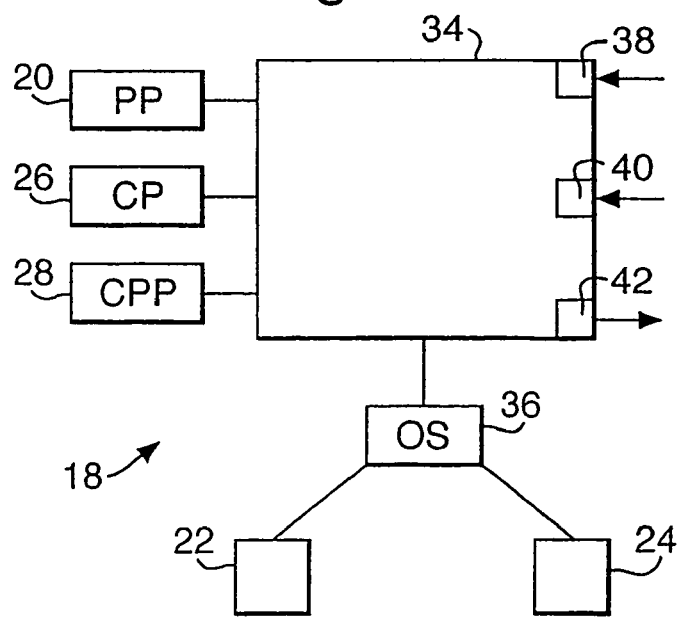
FIG. 6 shows in more detail the structure for resource sharing within a device of a PSD.

The arrangement of the device 18 is shown in more detail in FIG. 6. A security framework 34 controls access, via operating system 36, to resources 22 and 24. The security framework includes first input port 38 which receives local requests (i.e. requests by the device 18) for use of resources 22 and 24. On receipt of such a request, the security framework 34 interrogates the component policy instructions 26 to determine the allowability of the resource request. If the resource request is allowed, or conditionally allowed, the resource request, with the appropriate conditions, is passed to operating a system 36, which allows the appropriate usage of the resources 22, 24.

The security framework 34 also includes input port 40 for receiving resource requests from other devices 30, 32 within the PSD 19. The procedure on receipt of their request for use of a resource 26, 25, from another device will be described further below in relation to FIG. 7.

The security framework 34 further includes an output port 42 for passing requests for use of external resources to other devices 30,32 within the PSD 19. The operation of the PSD 19 with respect to such a request will be understood from the following discussion in relation to FIG. 7.

Figure 7:
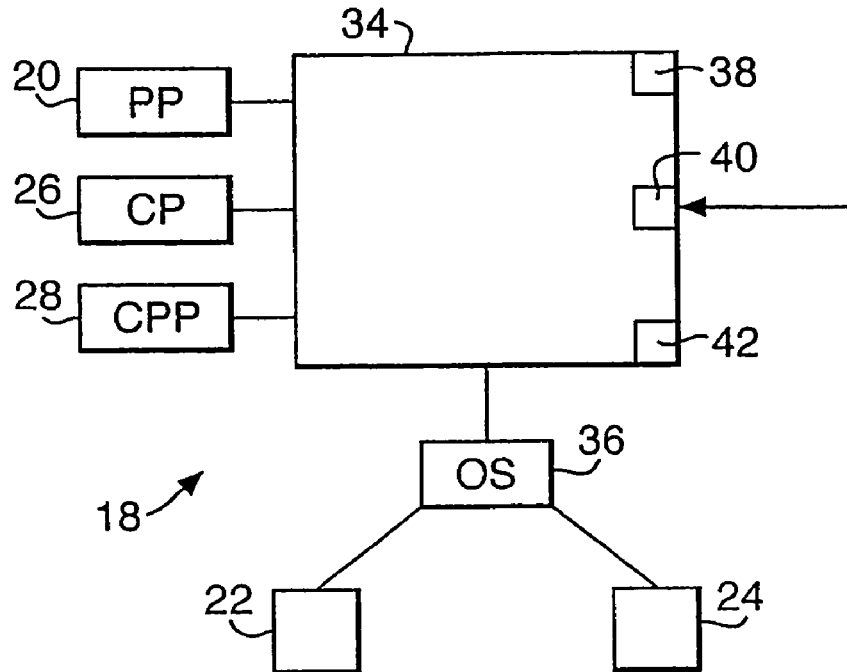
FIG. 7 shows the interaction between two devices within a PSD between which resource sharing is to occur.
Figure 7:
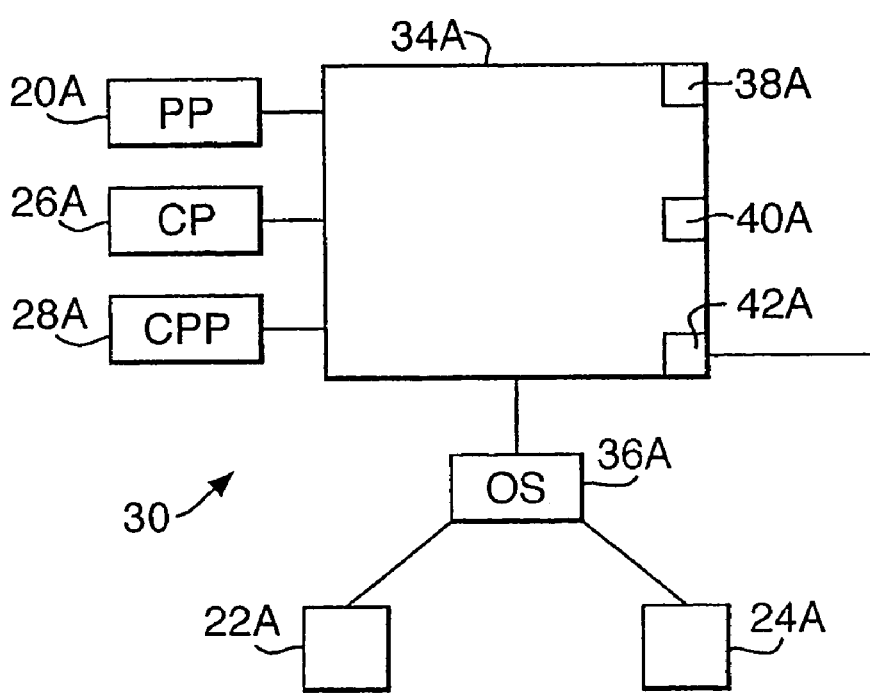

FIG. 7 shows the operation of the PSD 19 when device 30 wishes to make use of resource 22 of device 18. As is shown in FIG. 7, device 30 includes a structure similar to device 18 for dealing with resource sharing within the PSD 19. In FIG. 7 elements of device 30 which correspond to similar elements of device 18 are designated the with same reference number suffixed with "A".

In the FIG. 7 example, device 18 is a laptop computer and resource 22 is a printer. Device 30 is a mobile telephone and resource 24A is a store of SMS messages. The user of device 30 wishes to print an SMS message from store 24A.

The operating system 36A of device 30 passes the relevant SMS to security framework 34A together with a message that it is desired to print the SMS message. The security framework 34A consults the PSD policy instructions 20A, which includes a list of resources available within the PSD 19. In the examples shown, the PSD policy instructions 20A will indicate that device 18 includes printer resource 22. The SMS message, together with instructions to print this message are passed to device 18 via output port 42A of device 30 and input port 40 of device 18. This data will be encoded in the manner described above, using the key as described.

The security framework 34 of device 18 decodes the received data at port 40. The security framework 34 then consults component PSD profile instructions 26 to determine whether the resource request should be allowed. If the resource request is allowed, the request is passed to the resource (printer) 22 via operating system 36.

Each device within a PSD may be equally trusted, i.e. all devices within a PSD will have access to the same information and resources. Alternatively, devices within a PSD may have different "privileges", that is one device may be able to access information and resources that another device within the PSD is prevented from accessing. For example, a PSD may include two personal computers, PC A and PC B. These personal computers could be configured so that only PC A has access to the PSD user's e-mails (which could be stored on PC A or elsewhere). Such restrictions (or privileges) to the access of information within the PSD could be held on the policy file for that PSD). It is preferred that the restrictions or privileges can be changed within a PSD, as required. This will typically be performed under control of the PSD administrator.

The advantages of a PSD so far described include:
- It is not necessary for a new PSD member to share security associations with all existing PSD members to establish trusted communications with them. For example, if device D joins an existing PSD of A, B and C, which is defined by group key, KABC. Once D has been authenticated by A (the PSD administrator), and a bilateral communication key KAD established, A can send KABC to D under the protection of key KAD. D can then prove PSD membership with this and establish further bilateral secure communication keys with B and C.
- Reduction in the user interaction required as the number of imprinting events is reduced. For a PSD of n components, only n−1 imprinting sessions are necessary, compared to n(n−1)/2 in a conventional PAN without the PSD concept
- Use of the device with the best user interface for the PSD administrator for enrolling new members allows the most user friendly imprinting protocols to always be used
- Use of a PSD administrator with revocation checking facilities allows revocation checks to be performed when new devices with certificates are enrolled
- Consistent resource information across all devices
- Resources can be shared with other users without having to compromise interactions between one's own devices
- Designation of group roles:
    - Designation of a single device to perform the role of a gateway between all PSD devices and external devices.
    - Designation of devices to perform specialised tasks, for example calendar synchronisation, revocation checking
- Use of the shared security associations to perform secure broadcast
- A device can be nominated by the user to perform administrative tasks on his behalf, i.e. the PSD administrator
- Establishes another layer of security on top of link layer security
- Different PSDs can be created for different trust groups within a PAN to solve particular access control problems.

The PSD concept described above is applicable to networks other than PANs. The devices in the network (and domain) may be separated by large distances.

Devices could be manufactured or pre-configured to enrol in certain PSDs automatically. For example, a mobile telephone could be configured so that when it comes within communication range of a particular PSD it automatically enrols in that PSD. Where such automatic enrolment is provided, generally the exchange of data between devices in the PSD will be restricted to prevent private information being disclosed to other devices in the PSD.

For example, a PSD could be arranged by a train operating company that automatically enrolled appropriately programmed mobile telephones at a station so that train running information can be transmitted to the telephone for use by the user.

In the PSD arrangements described above each device within the PSD is capable of direct communication with each of the other devices in the PSD. For example, that communication may be via a cable connection between the components of the PSD or, more likely, by a wireless link, such as a Bluetooth link, an infra red link or any suitable radio link. The communication medium is provided particularly to allow direct communication between the devices. It can be considered as "private" or "local". Typically (although not necessarily) for these types of communications to be feasible the devices within the PSD will be located within the vicinity of each other. For example, the devices may be in the same room or in the same building. Such devices are hereinafter referred to as "local" members of the PSD and such communications are referred to as "local" communications.

There are circumstances where the user may wish to take one or more devices which are members of their PSD to a remote location (that is, a location which is not "local" and by means of which the "local" communication between the PSD components is not feasible) but may still wish to access other devices within the PSD. For example, a user may take his mobile telephone and PDA when travelling abroad and may wish to access their PC based at their home—possibly to synchronise data between the PDA and the home PC or to print a document using a printer connected to the PC.

It is not possible for direct communication to occur between the PDA and the home PC by means of the local communication media described above (because the PDA and the home PC are now in different countries).

As described above, when a device joins the PSD for the first time it will typically do this by means of a local communication with the PSD administrator. At that time an identifier that is unique within the PSD to the new device is assigned to the new device. The identifier allows communications to be addressed to that device so that they can be successfully delivered thereto. The identifier may be any suitable identifier. For example, it could be the Media Access Device address (MAC address) or the Bluetooth address of the device (if local communication is by Bluetooth). Alternatively, a local IP address may be assigned to each device by the PSD administrator.

Figure 8:
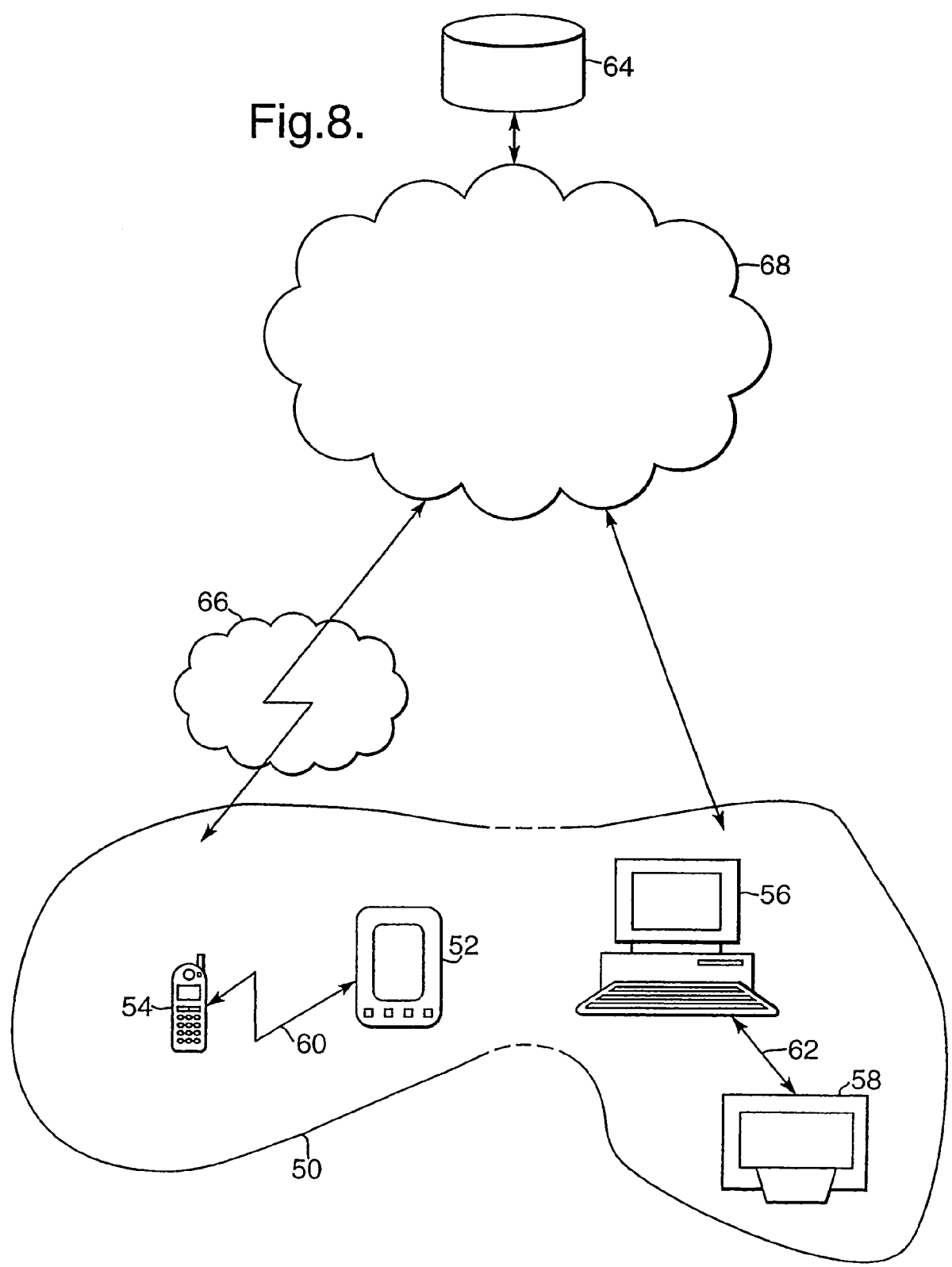
FIG. 8 shows the exchange of data between devices within a PSD where those devices are located remotely from one another.

In the embodiment to be described in relation to FIG. 8 a local IP address is assigned to each component of the PSD 50. The PDA 52 is assigned local IP address 169.254.1.1. The mobile terminal 54 is assigned local IP address 169.254.1.3. The home PC 56 is assigned local IP address 169.254.1.4. The printer 58 is assigned local IP address 169.254.1.6.

Although the PDA 52, the mobile terminal 54, the home PC 56 and the printer 58 are associated within PSD 50, in fact the PDA 52 and the mobile terminal 54 are remote from the PC 56 and the printer 58 such that direct local communication between the components is not possible, as indicated by the dotted lines of the PSD 50.

When the components in the PSD use the local communication method, as indicated by arrows 60 and 62, the local IP address will be the identifier used to allow communications between the devices to be successfully received.

However, in the embodiment being described the PDA 52 and mobile terminal 54 are remote from the home PC 56 and printer 58. To enable remote communication by the mobile terminal 54, the mobile terminal 54 is registered with a SIP server 64 to facilitate remote communication via a mobile or cellular telephone network 66. The SIP server 64 will allocate a public identifier to the mobile terminal 54 and also to any other components within the PSD 50 which are capable of remote communication. In this example, the home PC 56 includes an integral modem which allows connection via the fixed telephone network, and therefore the home PC 56 will be also assigned a public ID by the SIP server 64. The SIP server is configured so that all the devices registered therewith will be provided with a unique public ID. Typically, devices from a multiplicity of PSDs will be registered with the SIP server 64. Each of these devices will have a unique public ID. Typically, this will be a unique public IP address. A device wishing to initiate a communication session with another device will send a SIP invite message to the SIP server identifying the device with which it wishes to communicate—typically by using that device's SIP public ID. The SIP server then identifies the unique public IP address for that device and allows a communication session between the devices to commence.

Although the PDA 52 has a facility for local communication with other devices in the PSD 50, it does not have the facilities for remote communication. Therefore, a request from the PDA 52 for data exchange with the printer 58 will be routed via the user's mobile terminal 54 in order to allow that communication to be transmitted via the mobile terminal 54. Data transmitted from the mobile terminal 54 will pass to the printer 58 (by means of the home PC's modem) via the mobile network 66 with which the mobile terminal 54 is registered, the Internet 68 and then by a fixed telephone network-connection to the modem of the home PC 56.

Figure 9:
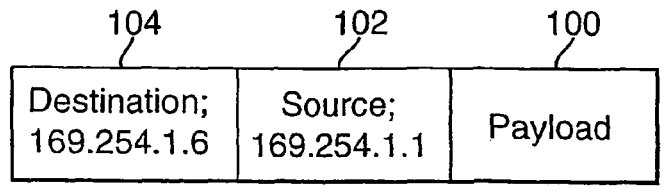
FIGS. 9 to 13 show the formation, encapsulation and "de-capsulation" of a data packet transmitted between respective devices within the PSD of FIG. 8.
Figure 10:
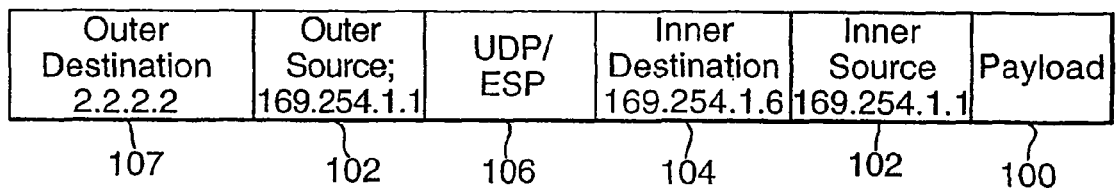

The PDA 52 generates an initial data packet as shown in FIG. 9. This data packet is of the same format as the data packet that would be sent to the printer 58 if local communication were possible between the PDA 52 and the printer 58. The initial data packet comprises the "payload" 100 (i.e. the data to be transmitted to the printer 58), together with an internal header comprising the local IP address 102 of the PDA 52 (being the source of the data packet) and the local IP address 104 of the printer 58 (being the destination of the data packet). The initial data packet is routed from the PDA 52 to the mobile terminal 54. Because the local IP addresses are not necessarily recognised outside the PSD 50, and because devices in respective PSD's may have identical local IP addresses, the local IP address is not used to route the data packet when it leaves the PSD 50. A further layer is added to the data packet of FIG. 9 to form the data packet of FIG. 10. The initial data packet of FIG. 9 has added to it a UDP header 106. In addition to the UDP header 106 an ESP header may be added to make the data within the initial data packet of FIG. 9 secure. An external header is then added which includes the local IP address 104 of the PDA and the SIP public ID 107 of the home PC 56 (2.2.2.2 in this example).

Figure 11:
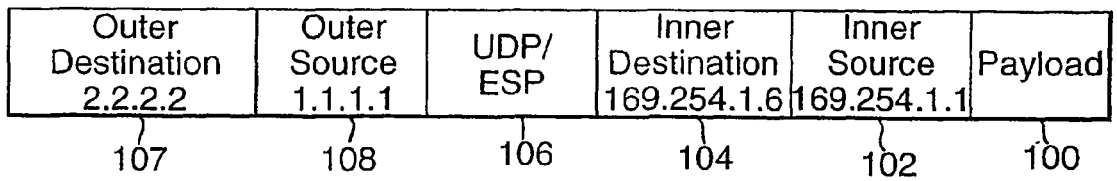

The mobile terminal 54 then modifies the external header as shown in FIG. 11 so that the local IP address of the PDA 52 is converted into the SIP public ID 108 of the mobile terminal 54.

It will be noted at this point that the outer header of the data packet comprises the SIP public ID 108 of the mobile terminal 54 and the SIP public ID 107 of the PC 56 even though the source device is the PDA 52 and the destination device is the printer 58. The mobile terminal 54 acts as a gateway device for the PDA 52 (and for any other devices within the PSD 50 capable of only local communication with the mobile terminal 54). Similarly, the PC 56 acts as the gateway device for the printer 58 (and any other devices of the PSD 50 capable of only local communication with the PC 56). The nature of the mobile telephone network 66 is such that only a single public ID will be provided to the mobile terminal 54 when that mobile terminal 54 registers with the mobile network 66. Similarly, when the PC 56 registers with the Internet 68 only a single IP address will be provided for the PC 56. The gateway devices operates a Network Address and Protocol Translation (NAPT), which maps the plurality of private IP address to a single public address—and vice versa.

Figure 12:
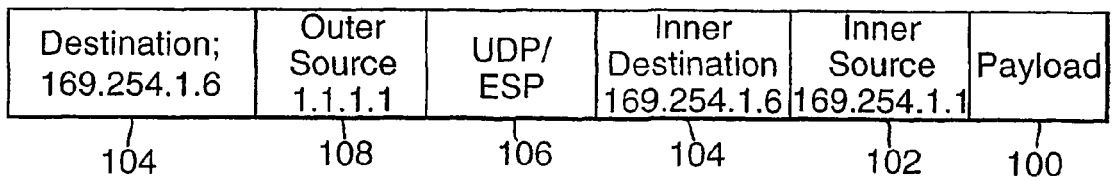
Figure 13:
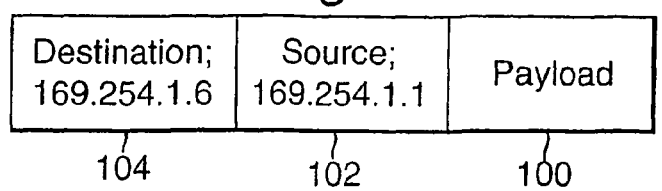

Now that the data packet includes an external header indicating the SIP public ID 108 of the mobile terminal 54 and the SIP public ID of the home PC 56, this data packet can be transmitted to the SIP server 64. The SIP server 64 will recognise the SIP public IDs in the external header of the data packet. The SIP public ID of the home PC 56 is used by the SIP server 64 to route the data packet (via the Internet 66 and the fixed telephone network) to the home PC 56. When the data packet is received by the home PC 56, the home PC 56 replaces the SIP public ID 107 with the local IP address of the printer 58 (FIG. 12). The initial data packet is then "de-capsulated" to form the data packet shown in FIG. 13, which corresponds to the initial data packet shown in FIG. 9. The "payload" 100 of the data packet transmitted by the local communication medium to the printer 58 can then be processed by the printer 58. Typically, the printer 58 will wish to transmit reply data to the PDA. To do this, the printer 58 will generate an initial data packet as shown in FIG. 14 including an internal header comprising the local IP address 104 of the printer 58, the local IP address of the PDA 102 and a "payload" generated by the printer 58. An external header is then added and modified as shown in FIGS. 15 and 16 using the same principles as described in relation to FIGS. 10 and 11. The data packet is then transmitted to the SIP server 64. The SIP server 64 is able to direct the data packet to the mobile terminal 54 (via the Internet 68 and the mobile telephone network 66 with which the mobile terminal 54 is registered) on the basis of the SIP public ID 108 of the mobile terminal 54. When the data packet is received by the mobile terminal 54, the initial data packet is processed and "de-capsulated" as shown in FIGS. 17 and 18 until the initial data packet (FIG. 8) is received by the PDA 52 and the "payload" 100 can be processed.

In the embodiments described above, each device is provided with PSD policy instructions which include a list of resources available within the PSD 50 in FIG. 8 or PSD 19 in FIG. 5.

In the modification of the FIG. 8 embodiment each device is not provided with such PSD policy instructions which indicate a list of resources available within the PSD 50. Instead, the resources available within the PSD are determined using the Service Location Protocol (SLP) or another suitable protocol such as Jini or Universal Plug-and-Play (UPnP). The SLP allows the gateway device to determine which resources are available locally within the PSD 50.

Determination of the resources available within the PSD 50 may be initiated by each device in the PSD 50 which is capable of local communication with the local gateway device sending a service request message which includes a request for the local gateway device to identify itself and provide its local IP address. Alternatively, the gateway device may periodically (and preferably infrequently) send a service request message to all devices within local communication range advertising that that gateway device is present.

Each device within local communication range of the local gateway device then registers the resources it can make available with the gateway device by sending a service registration message including its local IP address and the resources that are available.

Figure 19:
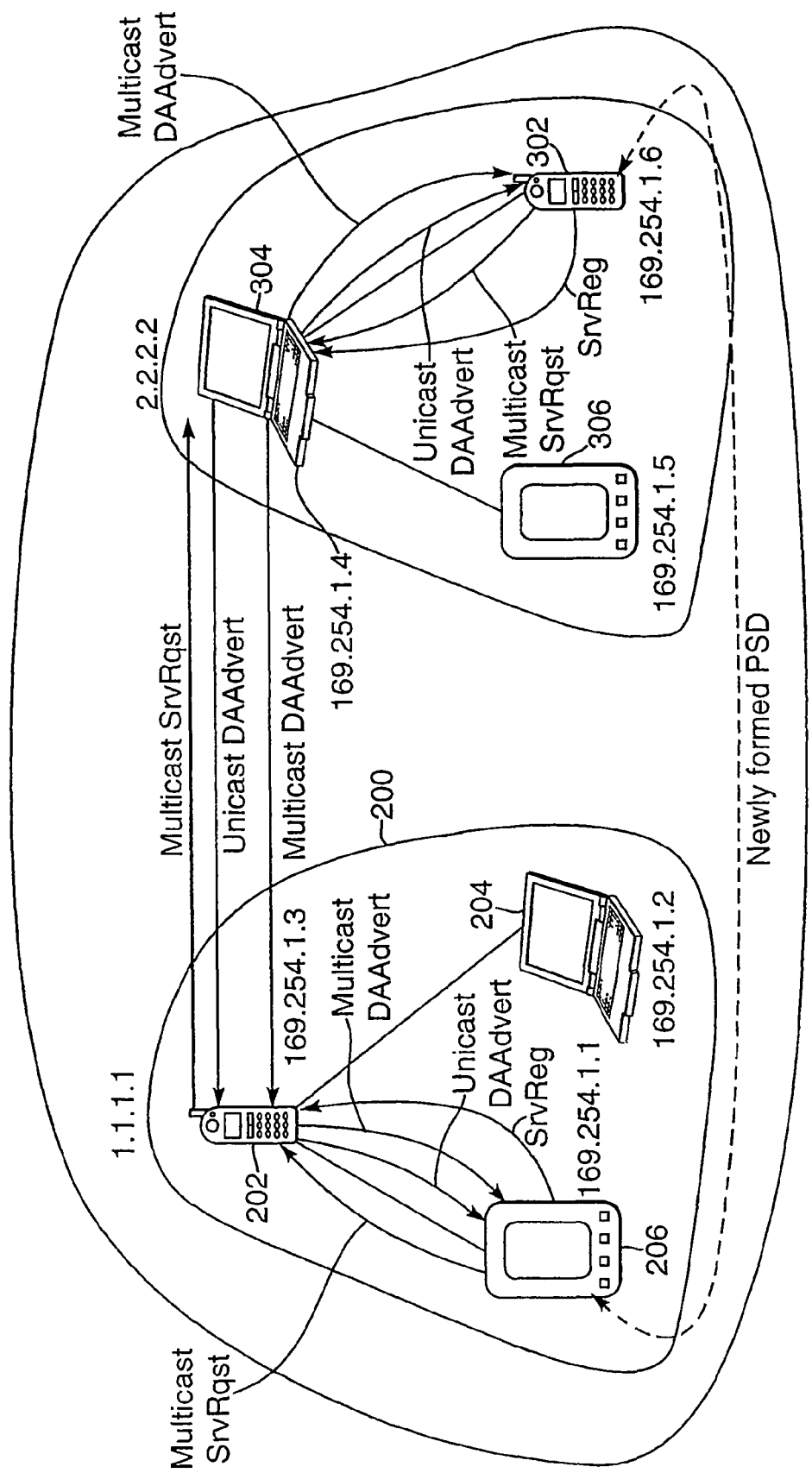
FIG. 19 shows an arrangement where resources are shared between two PSDs by means of local communications between those PSDs.

FIG. 19 shows a first PSD 200 within which are associated a mobile terminal 202, a laptop computer 204 and a PDA 206. In this example, each of those devices is capable of local communication with the other devices. The mobile terminal 202 acts as a gateway/administrator device and also performs most of the functions of the PSD administrator described in relation to the embodiments of FIGS. 1 to 7.

As indicated above, for the mobile terminal 202 to determine the resources available within the PSD 200 that device receives service registration messages from the laptop 204 and the PDA 206. As discussed above, the sending of those service registration messages may be initiated by the laptop 204 and the PDA 206, or they may be transmitted in response to a service request message from the mobile terminal 202.

In any event, when the service registration messages have been received by the mobile terminal 202, the mobile terminal 202 then has a record of the resources available within the PSD 200 and the local IP address where the relevant resources may be obtained.

FIG. 19 also shows a second PSD 300 including as its gateway/administrated device laptop 304 and, further, a PDA 306 and a mobile terminal 302. The mobile terminal 302 and the PDA 306 issue service registration messages to the laptop 304 so that it can be registered what resources are available within the PSD 300 and the local IP address at which those resources can be found.

According to the FIG. 19 embodiment, resources of the PSD 200 may be shared with devices of the PSD 300, and vice versa.

To achieve this, the laptop 304 issues periodically a message advertising the existence of PSD 300. This message is received, for example by the same local communication medium as is used within PSD 200 and PSD 300, by the mobile terminal 202. The mobile terminal 202, if it wants to make use of services within the PSD 300, issues a service request message to the laptop 304 requesting details of resources available from the PSD 300. The laptop 304 responds with a service registration message identifying the resources available from the PSD 300. The mobile terminal 202 then registers the resources available within the PSD 300, and the IP addresses of the respective devices in the device 300 from which those services can be obtained.

In a similar manner, the mobile terminal 202 may transmit a service registration message to the laptop 304 so that the resources available in the PSD 200 are registered on the laptop 304, together with the IP addresses of the devices providing those services from PSD 200.

For example, if the PDA 306 wishes to transmit data via a GPRS enabled mobile terminal, the PDA 306 transmits a request for service message to the laptop 304. The laptop 304 identifies that GPRS connection is provided by mobile terminal 202 (in this example the mobile terminal 302 is not GPRS enabled). The laptop 304 then transmits a message to the PDA 306 providing the IP address of the GPRS mobile terminal 202. A communication session can then be established directly between the PDA 306 and the mobile terminal 202.

Figure 20:
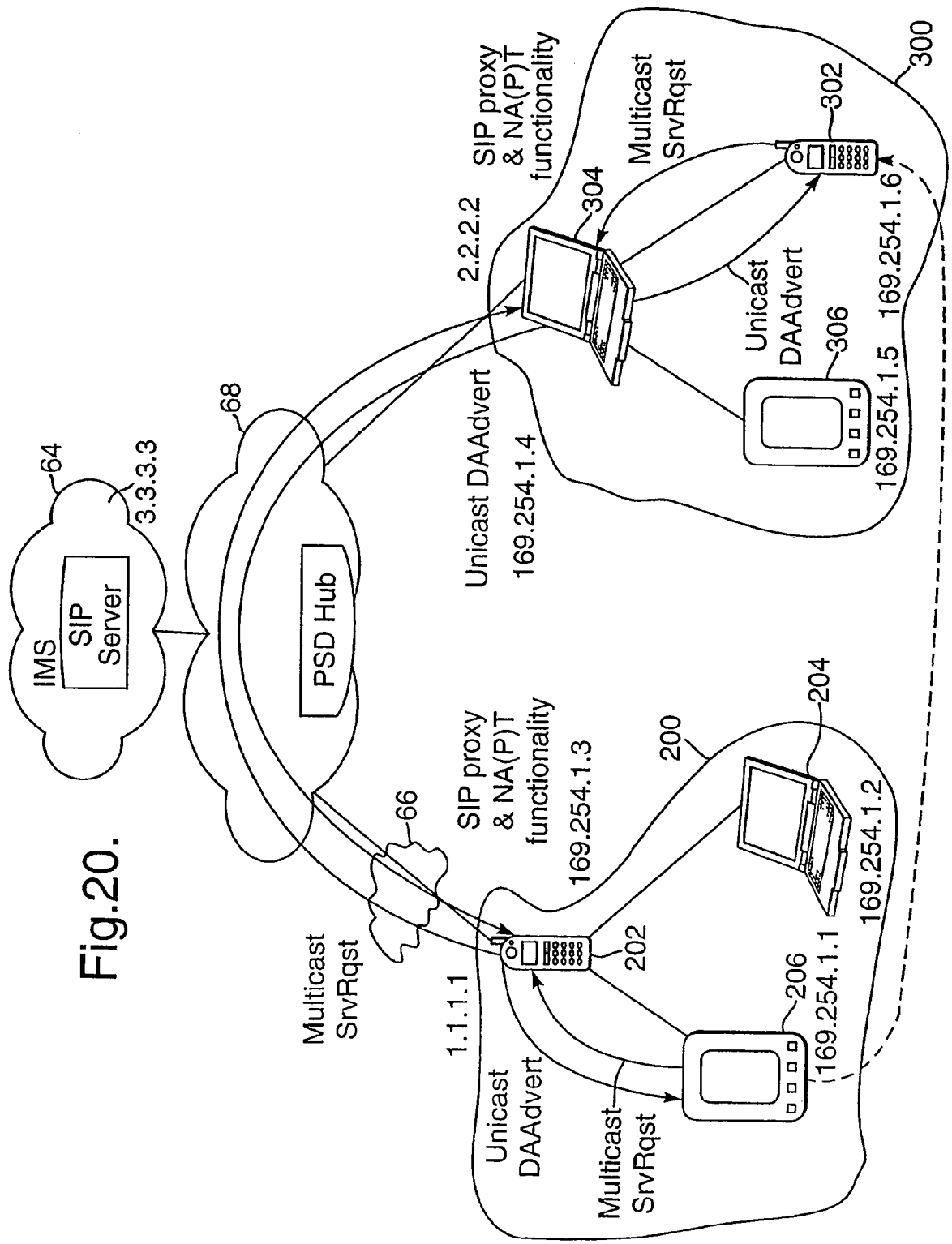
FIG. 20 shows the sharing of resources between two PSDs when those PSDs are positioned remotely from one another.

FIG. 20 shows a further embodiment where communication between the PSD 200 and the PSD 300 is not possible using a local communication medium. In this example, communication between the PSD 200 and the PSD 300 must be performed via the Internet 68 and mobile network 66. In this embodiment, the gateway devices of the respective PSDs 200,300 (the mobile terminal 202 and the laptop 304) have their SIP public ID addresses registered with the SIP server 64 in a similar manner to the FIG. 8 embodiment. Communication is therefore possible between the mobile terminal 202 and the laptop 304.

The services within each PSD 200,300 are registered with the relevant gateway device (mobile terminal 202 and laptop 304, respectively) in the manner described in relation to FIG. 19. The resources of the respective PSD's 200,300 can be shared by data exchange between the mobile terminal 202 and the laptop 304 in a similar manner to that described in the FIG. 19 embodiment.

However, in the FIG. 20 embodiment these communications must be routed via the mobile network 66 and the Internet 68. To allow these communications to be appropriately routed they must be encapsulated in the manner described in relation to the FIG. 8 embodiment, as described in FIGS. 9 to 18.

Of course, in the FIGS. 19 and 20 embodiments, resources can be shared between more than two PSDs. Different PSDs may join the resource showing at different times. For example, the various PSDs could be those of users attending a meeting. The resources shared may be restricted in this scenario—for example, to particular documents relevant to the meeting.

The invention claimed is:

1. A method of sharing resources between a plurality of devices, each one of the devices being provided in at least a first association of devices or a second association of devices, and each device within the first and second associations having an internal identifier for identifying the device within its association for the purpose of delivering communications to that device, wherein the first association of devices has a first gateway device with a first external identifier and the second association of devices has a second gateway device with a second external identifier, the method comprising:

the first gateway device storing a first record of:
  a plurality of resources provided by devices within the first association of devices that are available for use by devices external to the first association, and where each resource is associated in the first record with a corresponding internal identifier; and
  a plurality of resources provided by devices within the second association of devices that are available for use by devices external to the second association;

the second gateway device storing a second record of:
  a plurality of resources provided by devices within the second association of devices that are available for use by devices external to the second association, and where each resource is associated in the second record with a corresponding internal identifier; and
  a plurality of resources provided by devices within the first association of devices that are available for use by devices external to the first association;

a first device within the first association of devices sending a first communication to the first gateway device, the first communication relating to provision of a particular resource available from a second device in the second association of devices;

the first gateway device using the first record to determine an external identifier associated with the particular resource, the first gateway device sending a second communication relating to the provision of the particular resource, the second communication including the determined external identifier for enabling the second communication to be received by the second association of devices.

2. The method of claim 1, further comprising:
the first gateway device transmitting the communication to the second gateway device across a communication network via a processing node.

3. The method of claim 2, wherein the determined external identifier comprises a first portion which uniquely identifies the first association of devices to the communication network and a second portion which uniquely identifies the second association of devices to the communication network.

4. The method of claim 3, wherein the first portion of the determined external identifier enables the second communication to be transmitted via the communication network to the processing node, which processing node enables the second communication to subsequently be forwarded to the second association of devices in dependence upon the second portion of the determined external identifier.

5. The method of claim 3, wherein the communication network comprises the Internet and the determined external identifier enables the determination of a unique IP address of at least one of the second association of devices and the first association of devices.

6. The method of claim 2, further including registering the first and second gateway devices with the processing node.

7. The method of claim 2, further including the processing node assigning the first and second external identifiers to the first and second gateway devices respectively.

8. The method of claim 1, wherein the second communication transmitted by the first gateway device includes the internal identifier of the first device within the first association of devices from which the first communication originated.

9. The method of claim 1, wherein the second communication transmitted by the first gateway device includes the internal identifier of the second device in the second association of devices.

10. The method of claim 1, further comprising:
the second gateway device receiving said second communication relating to the provision of the particular resource and providing the second communication to the particular device in the second association of devices.

11. The method of claim 1, further comprising:
the first gateway device receiving a reply communication from the second gateway device relating to the provision of the particular resource by the second device in the second association of devices and onwardly transmitting that reply communication to the first device from which the first communication relating to the provision of the particular resource originated.

12. The method of claim 1, further comprising
each of the devices within the first association of devices willing to provide a resource transmitting a message to the gateway device indicating the available resource
the first gateway device receiving and storing the messages.

13. The method of claim 12, wherein the messages stored on the first gateway device enables selection of a device within the first association of devices willing to provide a requested resource and routing of a request for use of the requested resource.

14. The method of claim 12, wherein the message is transmitted in response to a request message from the first gateway device.

15. The method of claim 1, further including the first and second gateway devices periodically transmitting a message advertising the existence of the first and second association of devices, respectively.

16. The method of claim 1, further including:
each gateway device providing each other device in its association with security data, the security data of each device being interpretable by each other device within the association, particular modes of communication only being allowed between devices within the association having such security data; and
each gateway device selectively enabling sharing of said resources between the devices within its association when the devices are able to communicate directly.

17. A system for allowing the sharing of resources between a plurality of devices, each one of the devices being provided in a first association of devices or a second association of devices and each device within the first and second associations having an internal identifier for identifying the device within its association for the purpose of delivering communications to that device, the system comprising:
a first gateway device with a first external identifier, the first gateway device configured to store a first record of
a plurality of resources provided by devices within the first association of devices that are available for use by devices external to the first association, and where each resource is associated in the first record with a corresponding internal identifier; and
a plurality of resources provided by devices within the second association of devices that are available for use by devices external to the second association;
a second gateway device with a second external identifier, the second gateway device configured to store a second record of:
a plurality of resources provided by devices within the second association of devices that are available for use by devices external to the second association, and where each resource is associated in the second record with a corresponding internal identifier; and
a plurality of resources provided by devices within the first association of devices that are available for use by devices external to the first association;
the first gateway device further configured to use the first record to determine an external identifier relating to a particular resource available from a second device in the second association of devices, in order to provide a communication from a first device within the first association of devices, relating to the provision of the particular resource, to the second gateway device in the second association of devices, the communication including the determined external identifier for enabling that communication to be received by the second association of devices.

18. The system of claim 17, wherein the first gateway device is further configured to transmit the communication to the second gateway device across a communication network via a processing node.

19. The system of claim 18, wherein the determined external identifier comprises a first portion which uniquely identifies the first association of devices to the communication network and a second portion which uniquely identifies the second association of devices to the communication network.

20. The system of claim 19, wherein the first portion of the determined external identifier is configured to enable the communication to be transmitted via the communication network to a processing node, which processing node is configured to enable the communication to subsequently be forwarded to the second association of devices in dependence upon the second portion of the determined external identifier.

21. The system of claim 19, wherein the communication network comprises the Internet and the determined external identifier is further configured to enable the determination of a unique IP address of at least one of the second association of devices and the first association of devices.

22. The system of claim 18, wherein the processing node is configured to register the first and second gateway devices with the processing node.

23. The system of claim 18, wherein the processing node is further configured to assign the first and second external identifiers to the first and second gateway devices respectively.

24. The system of claim 17, wherein the communication transmitted by the first gateway device includes the internal identifier of the device within the first association of the devices from which that communication originated.

25. The system of claim 17, wherein the communication transmitted by the first gateway device includes the internal identifier of the second device in the second association of devices.

26. The system of claim 17, wherein the second gateway device is further configured to receive said communication relating to the provision of the particular resource and to provide that communication to the second device in the second association of devices.

27. The system of claim 17, wherein the first gateway device is further configured to receive a reply communication from the second gateway device relating to the provision of resources by the second device in the second association of devices and to onwardly transmit that reply communication to the first device from which the communication relating to the provision of the particular resource originated.

28. The system of claim 17, wherein each of the devices within the first association of devices willing to provide a resource is configured to transmit a message to the first gateway device indicating the resource available, which message is received and stored by the first gateway device.

29. The system of claim 28, wherein the first gateway device is configured to use the stored messages to enable selection of a device within the first association of devices willing to provide a requested resource and to enable routing of a request for use of the requested resource to the corresponding device.

30. The system of claim 28, wherein the devices of the first association of devices which are willing to provide a resource are configured to transmit the message in response to a request message from the first gateway device.

31. The system of claim 17, wherein the first and second gateway devices are further configured to periodically transmit a message advertising the existence of the first and second association of devices, respectively.

32. The system of claim 17, wherein each gateway device is further configured to provide each other device in its association with security data, the security data of each device being interpretable by each other device within the association, particular modes of communication only being allowed between devices within the association having such security data; and each gateway device further configured to selectively enable sharing of said resources between the devices within its association when the devices are able to communicate directly.

33. An association of devices between which resources are shared, each device within the association having an internal identifier for identifying the device within the association for the purpose of delivering communications to the device, the association of devices comprising:

a gateway device with an external identifier, the gateway device configured to communicate with one or more other associations of devices, the one or more other associations of devices also having a gateway device with an external identifier, and wherein the gateway device of the association of devices is further configured to store a record of:

a plurality of resources provided by devices within the association that are available for use by devices external to the association, and where each resource is associated in the stored record with a corresponding internal identifier; and a plurality of resources provided by devices within the one or more other associations of devices that are available for use by devices in the association; and a first device configured to send a first communication to the gateway device, the communication relating to provision of a particular resource available from a second device in one of the one or more other associations of devices, wherein the gateway device is configured to use the stored record to determine an external identifier associated with the particular resource and to send a second communication relating to the provision of the particular resource, the second communication including the determined external identifier for enabling the second communication to be received by the other association of devices.

34. The association of claim 33, wherein the gateway device is configured to transmit the second communication to the other association of devices across a communication network via a processing node.

35. The association of claim 34, wherein the determined external identifier comprises a first portion which uniquely identifies the association of devices to the communication network and a second portion which uniquely identifies the other association of devices to the communication network.

36. The association of claim 35, wherein the first portion of the determined external identifier enables the second communication to be transmitted via the communication network to the processing node, which processing node enables the second communication to subsequently be forwarded to the other association of devices in dependence upon the second portion of the determined external identifier.

37. The association of claim 35, wherein the communication network comprises the Internet and the determined external identifier enables the determination of a unique IP address of at least one of the association of devices and the other association of devices.

38. The association of claim 33, wherein the second communication transmitted by the gateway device includes the internal identifier of the first device from which the first communication originated.

39. The association of claim 33, wherein the second communication transmitted by the gateway device includes the internal identifier of the second device in the other association of devices.

40. The association of claim 33, wherein the gateway device is configured to receive a reply communication from a gateway device of the other association of devices, the reply communication relating to the provision of the particular resource, and to onwardly transmit that reply communication to the first device from which the first communication relating to the provision of the particular resource originated.

41. The association of claim 33, wherein each of the devices within the association of devices which are willing to provide a resource are configured to transmit a message to the gateway device indicating the corresponding resource available, which message is received and stored by the gateway device.

42. The association of claim 41, wherein the gateway device is configured to use the stored messages to enable selection of a device within the association of devices willing to provide a requested resource and to enable routing of a request for use of the requested resource to the corresponding device.

43. The association of devices of claim 41, wherein each device willing to provide a resource is configured to transmit the message in response to a request message from the gateway device.

44. The association of claim 33, wherein the other association of devices includes an other gateway device corresponding to the gateway device of the association of devices, and wherein the gateway device is adapted to communicate with the other gateway device of the other association of devices.

45. The association of devices of claim 33, wherein the gateway device is further configured to periodically transmit a message advertising the existence of the association of devices.

46. The association of devices of claim 33, wherein the gateway device is configured to:

provide each other device in the association with security data, the security data of each device being interpretable by each other device within the association, particular modes of communication only being allowed between devices within the association having such security data; and selectively enable sharing of said resources between the devices within the association when the devices are able to communicate directly.

* * * * *